US008018932B1

(12) United States Patent
Eli et al.

(10) Patent No.: US 8,018,932 B1
(45) Date of Patent: Sep. 13, 2011

(54) METHODS AND APPARATUS FOR SENDING A MULTICAST PACKET FROM MULTIPLE NETWORK INTERFACES USING THE SAME MAC SOURCE ADDRESS

(75) Inventors: Eldad Bar Eli, Ramat Hasharon (IL); Doron Oz, Even Yehuda (IL)

(73) Assignee: Cisco Technology, Inc., San Jose, CA (US)

( * ) Notice: Subject to any disclaimer, the term of this patent is extended or adjusted under 35 U.S.C. 154(b) by 3144 days.

(21) Appl. No.: 10/184,486

(22) Filed: Jun. 28, 2002

(51) Int. Cl.
*H04L 12/56* (2006.01)
(52) U.S. Cl. ........ 370/390; 370/389; 370/470; 370/471; 370/475
(58) Field of Classification Search .......... 370/352–354, 370/389, 390, 392, 395.5, 395.52, 395.53, 370/400, 401, 471, 475
See application file for complete search history.

(56) References Cited

U.S. PATENT DOCUMENTS

| 5,095,480 | A | * | 3/1992 | Fenner | 370/238 |
| 5,426,637 | A | * | 6/1995 | Derby et al. | 370/401 |
| 5,684,800 | A | * | 11/1997 | Dobbins et al. | 370/401 |
| 6,208,647 | B1 | | 3/2001 | Deng et al. | |
| 6,331,983 | B1 | * | 12/2001 | Haggerty et al. | 370/400 |
| 6,934,292 | B1 | * | 8/2005 | Ammitzboell | 370/400 |

FOREIGN PATENT DOCUMENTS

| EP | 978977 A1 * | 2/2000 |
| WO | WO 03062955 A2 * | 7/2003 |

OTHER PUBLICATIONS

Liao, Wanjiun et al., "Source Filtering in IP Multicast Routing," Ninth International Conference on Network Protocols. Nov. 2001. pp. 82-90.*
Acharya, A. et al., "IP Multicast Extensions for Mobile Internetworking," Fifteenth Annual Joint Conference of the IEEE Computer Societies. Networking the Next Generation, INFOCOM '96. vol. 1. Mar. 1996. pp. 67-74.*
Ethernet Technologies, Chapter 7, Internetworking Technologies Handbook, Third Edition, Cisco Systems, Inc., Cisco Press 2000, pp. 7-1 to 7-40.
Internet Protocol Multicast, Chapter 43, Internetworking Technologies Handbook, Third Edition, Cisco Systems, Inc., Cisco Press 2000, pp. 43-1 to 43-16.

* cited by examiner

*Primary Examiner* — Donald Mills
(74) *Attorney, Agent, or Firm* — The Law Office of Kirk D. Williams

(57) ABSTRACT

Methods and apparatus are disclosed for sending a multicast packet from multiple network interfaces across multiple networks using the same media access source address (MAC source address). One implementation includes a processing element and a network interface for each of the multiple networks. The processing element generates and initiates sending of a multicast packet having a same media access source address (MAC source address) from at least two of the multiple network interfaces. In one implementation, a single copy of the multicast packet is buffered, and each of the network interfaces retrieves, such as via a direct memory access (DMA) request, the multicast packet and forwards it to an attached network.

27 Claims, 4 Drawing Sheets

METHODS AND APPARATUS FOR SENDING A MULTICAST PACKET FROM MULTIPLE NETWORK INTERFACES USING THE SAME MAC SOURCE ADDRESS

FIELD OF THE INVENTION

This invention relates to computer and communications systems; and more particularly, the invention relates to sending a multicast packet from multiple network interfaces across multiple networks using the same media access source address (MAC source address).

BACKGROUND OF THE INVENTION

The communications and computer industries are rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a router, typically receives, processes, and forwards or discards a packet based on one or more criteria, including the type of protocol used by the packet, addresses of the packet (e.g., source, destination, group), and type or quality of service requested. Multicast packets that are received by a router are forwarded to multiple interfaces of the router based on the router multicast tables, as dictated by higher-level protocols, such as Internet Group Membership Protocol (IGMP), etc.

For certain network protocols, such as Ethernet, each network interface of the router or computer system has a different media access address (MAC address) assigned to it. Packets sent from a particular network interface then use the MAC address assigned to the network interface as the source address of the packet. Thus, when data corresponding to a multicast packet is to be sent out multiple interfaces, currently different multicast packets (e.g., Ethernet packets) must be generated, with each of these packets including the address of the corresponding network interface as the packet's source address.

Known approaches to generate these multiple packets include rewriting of the MAC source by the hardware; splitting the packet into two parts and having a different header allocated and common data and then chaining the two together upon transmission to the network interfaces; serializing the output of the packets among interfaces and rewriting the header before sending the packet on each interface; and creating a new packet for each interface with the interface's MAC source address. However, some of these approaches require specialized hardware and software, and can be resource (e.g., processor hardware and/or memory) intensive.

SUMMARY OF THE INVENTION

Methods and apparatus are disclosed for sending a multicast packet from multiple network interfaces across multiple networks using the same media access source address (MAC source address). One embodiment includes a processing element and network interfaces for each of the multiple networks. The processing element generates and initiates sending of a multicast packet having a same media access source address (MAC source address) from at least two of the multiple network interfaces.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
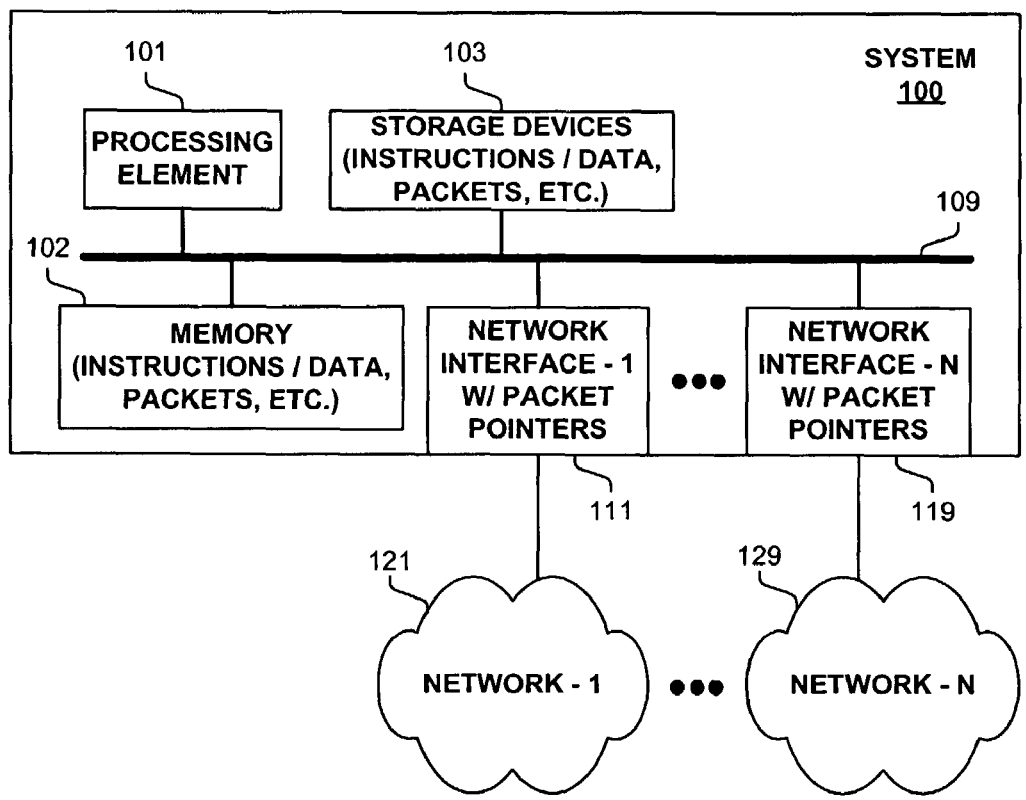
FIG. 1 is a block diagram of a system used in one embodiment for sending a multicast packet from multiple network interfaces across multiple networks using the same MAC source address.

Methods and apparatus are disclosed for sending a multicast packet from multiple network interfaces across multiple networks using the same MAC source address. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet, and which may or may not include modifying and/or forwarding the packet.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed a processing element and/or control logic, and data which is manipulated a processing element and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modify or not modifying the coupled signal or communicated information. The term "subset" is used to indicate a group of all or less than all of the elements of a set. Moreover, the term "or" is used herein to identify an alternative selection of one or more, including all, of the conjunctive items.

Methods and apparatus are disclosed for sending a multicast packet from multiple network interfaces across multiple networks using the same media access source address (MAC source address). One embodiment includes a processing element and a network interface for each of the multiple networks. The processing element generates and initiates sending of a multicast packet having a same media access source address (MAC source address) from at least two of the multiple network interfaces. In one embodiment, a single copy of the multicast packet is buffered, and each of the network interfaces retrieves, such as via a direct memory access (DMA) request, the multicast packet and forwards it to an attached network. Sending a multicast packet with the same MAC source address is especially useful for, but not limited to routers, and other communications and computer systems which do not have hardware support for MAC packet field rewriting or DMA chaining.

In one embodiment, a MAC address is selected that will be used as a MAC source address when sending of all multicast traffic on all network interfaces. In one embodiment, the MAC source address varies depending on the particular network interfaces or traffic involved, or based on some other criteria. This MAC source address may either be unique for the multicast traffic, be a MAC address of one of the network interfaces, or be assigned or generated in any manner. The same MAC address will be included in the multicast packet as its MAC source address, and the same packet will be transmitted on all interfaces associated with the multicast packet, thus eliminating any need to modify the packet. All other traffic will typically use the regular MAC address of the network interface (e.g., port), including ARP responses, etc.

FIG. 1 illustrates a block diagram of a system 100, which may be part of a router or other communications or computer system, used in one embodiment for sending a multicast packet from multiple network interfaces 111-119 across multiple networks 121-129 using the same MAC source address. In one embodiment, system 100 includes a processing element 101, memory 102, storage devices 103, and network interfaces 111-119, which are coupled via one or more communications mechanisms 109 (shown as a bus for illustrative purposes). In one embodiment, network interfaces 111-119 support Ethernet, Token Ring, and/or other network protocols.

Various embodiments of system 100 may include more or less elements. In one embodiment, a single chip or ASIC contains system 100. In one embodiment, less than all, even no two components, of system 100 reside on the same chip or ASIC. The operation of system 100 is typically controlled by processing element 101 using memory 102 and storage devices 103 to perform one or more tasks or processes, such as for sending a multicast packet from multiple network interfaces 111-119 across multiple networks 121-129 using the same MAC source address. Memory 102 is one type of computer-readable medium, and typically comprises random access memory (RAM), read only memory (ROM), flash memory, integrated circuits, and/or other memory components. Memory 102 typically stores computer-executable instructions to be executed by processing element 101 and/or data which is manipulated by processing element 101 for implementing functionality in accordance with one embodiment of the invention. Storage devices 103 are another type of computer-readable medium, and typically comprise solid state storage media, disk drives, diskettes, networked services, tape drives, and other storage devices. Storage devices 103 typically store computer-executable instructions to be executed by processing element 101 and/or data which is manipulated by processing element 101 for implementing functionality in accordance with one embodiment of the invention.

Figure 2:
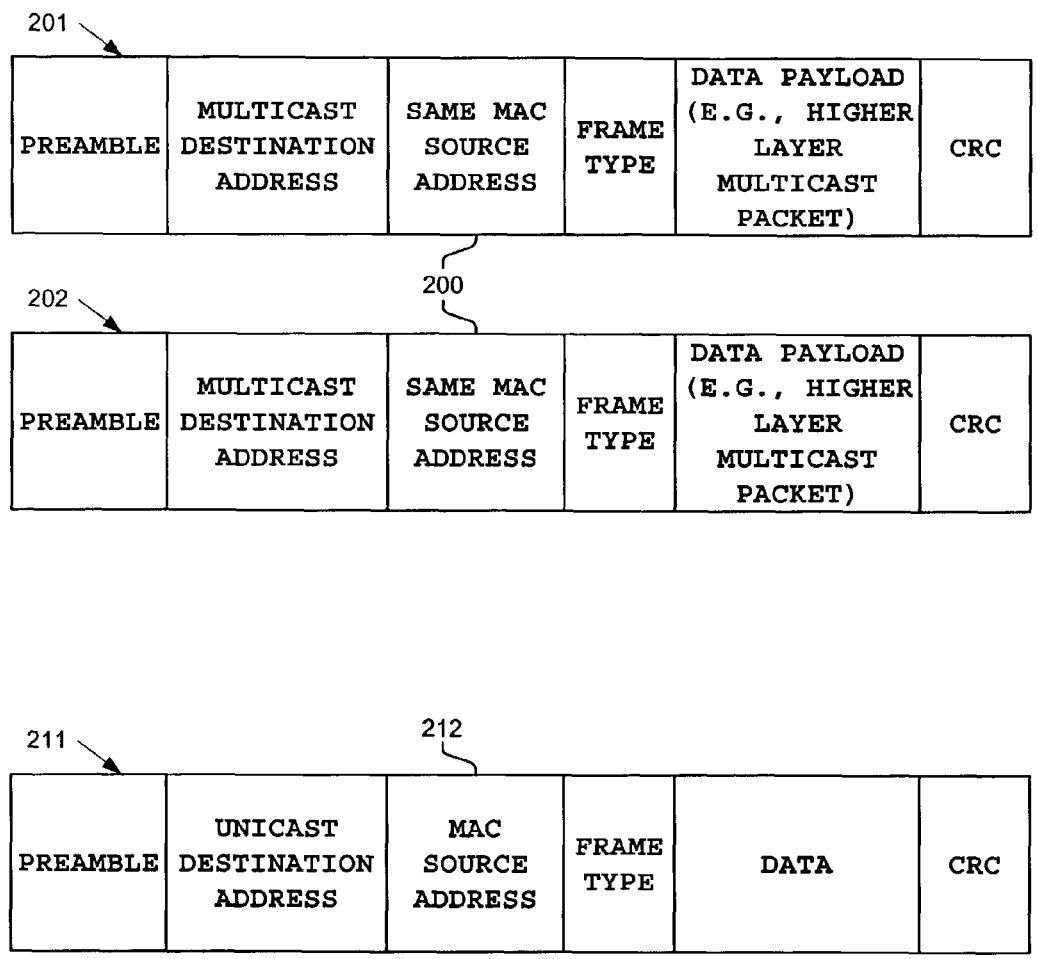
FIG. 2 illustrates exemplary multicast and unicast packets sent in one embodiment.

FIG. 2 illustrates exemplary multicast packets 201-202 and a unicast packet 211 sent in one embodiment. In one embodiment, packets 201-211 correspond to Ethernet packets, Token Ring packets, or packets of another protocol, including, but not limited to other Layer 2 protocols. As shown, multicast packets 201 and 202 include the same MAC source address 200, and multicast packet 201 is sent out a first network interface across a first network, and multicast packet 202 is sent out a second network interface across a second network. In one embodiment, unicast packet 211 contains a MAC source address 212 corresponding to the network interface from which it is sent, with the network interface possibly being the first or second network interface from which a multicast packet 201 or 202 is also sent.

Figure 3:
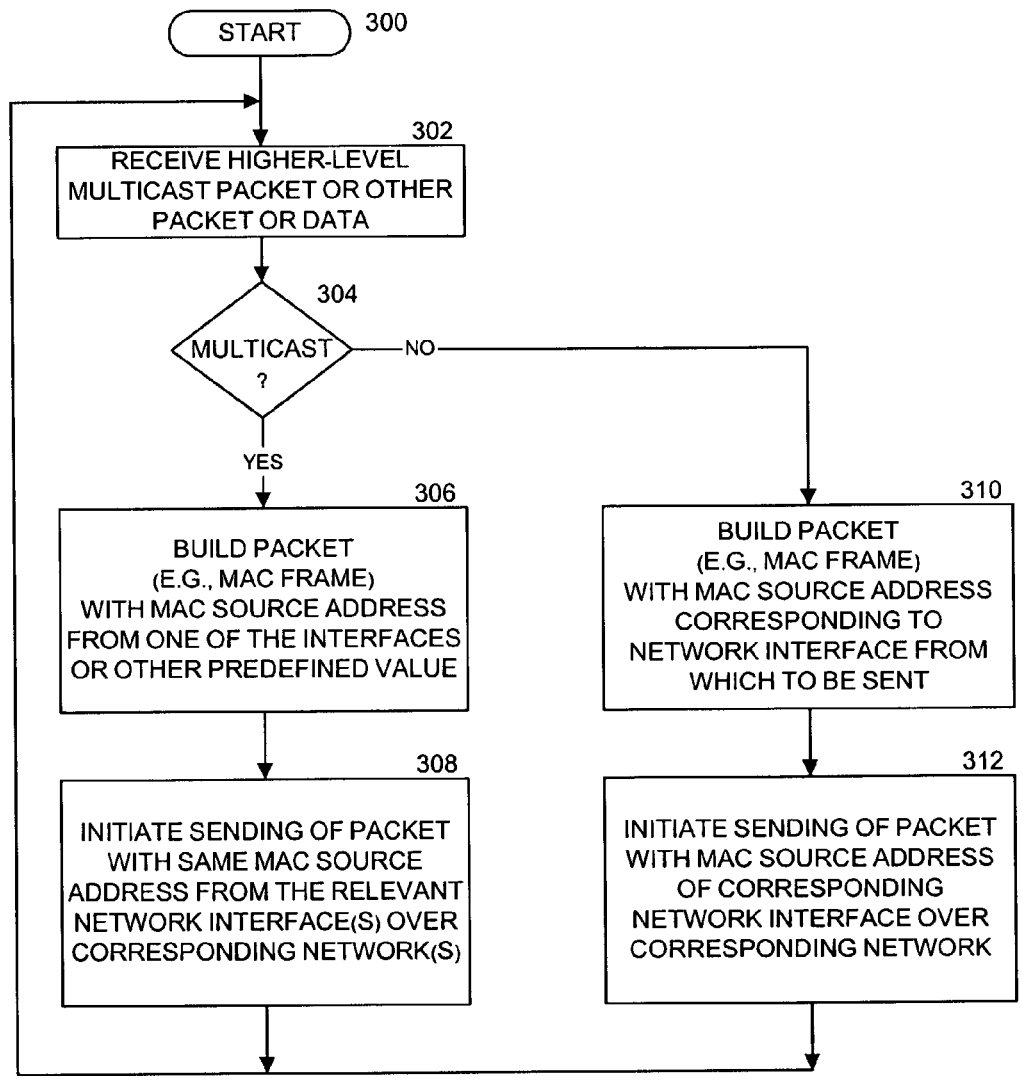
FIG. 3 is a flow diagram of a process used in one embodiment for sending a multicast packet from multiple network interfaces across multiple networks using the same MAC source address.

FIG. 3 illustrates a process used in one embodiment for sending a multicast packet from multiple network interfaces across multiple networks using the same MAC source address. Processing begins with process block 300, and proceeds to process block 302, wherein a higher-level multicast packet (e.g., TCP/IP) or other packet or data to be sent in a multicast packet (e.g., MAC frame) is received or identified. Next, as determined in process block 304, if a multicast packet is to be sent, then in process block 306, a single packet is generated, typically encapsulating the received higher-level packet or other information, using a MAC source address from one of the network interfaces or based on some other predetermined value. This packet is typically stored in a memory or other computer-readable medium. Next, in process block 308, the sending of the multicast packet created in process block 306 is initiated such that the packet will be sent from one or more of the multiple network interfaces. In one embodiment, a pointer to the memory location of the multicast packet is queued and/or transferred to a network interface. Processing then returns to process block 302.

Otherwise, the packet to be sent is determined to be a unicast packet in process block 304. Then, in process block 310, a unicast packet is generated, typically encapsulating the received higher-level packet or other information, using the MAC source address of the network interface from which the packet is to be sent. In process block 312, the sending of the unicast packet is initiated. In one embodiment, a pointer to the memory location of the unicast packet is queued and/or transferred to a network interface. Processing then returns to process block 302.

Figure 4:
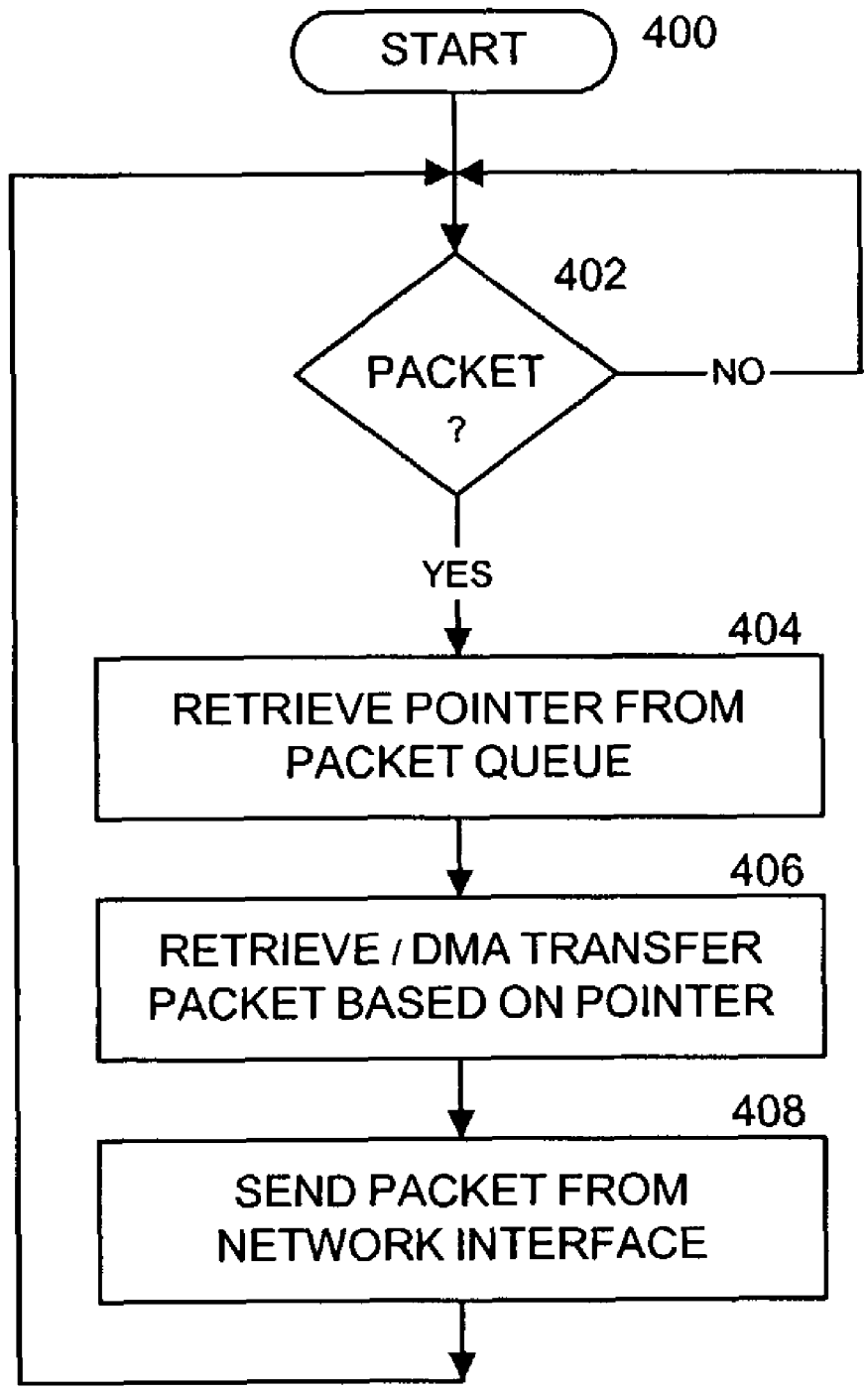
FIG. 4. is a flow diagram of a network interface process used in one embodiment.

FIG. 4. illustrates a process used in one embodiment for each network interface. Processing begins with process block 400, and loops at process block 402 until there is a packet to be sent. Next, in process block 404, a pointer to the packet to be sent is retrieved from a packet queue. (Note, in one embodiment, the packet itself is retrieved from the queue and in which case, processing typically proceeds directly to process block 408). Next, in process block 406, the actual packet is retrieved from memory or other computer-readable medium using any technique, such as, but not limited to a DMA transfer. Next, in process block 408, the packet is sent from the network interface, and processing returns to process block 402.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be performed in different processes and/or re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for sending multicast packets over a plurality of networks, the apparatus comprising:
   a processing element; and
   a plurality of network interfaces coupled to the processing element, each of the plurality of network interfaces coupled to one of the plurality of networks;
   wherein the processing element is configured to generate and initiate sending of a multicast packet including a same media access source address (MAC source address) from at least two of the plurality of network interfaces.

2. The apparatus of claim 1, wherein each of the plurality of network interfaces is assigned a different MAC address: wherein the apparatus is configured to send unicast packets from the plurality of network interfaces with the MAC source address of a unicast packet being the MAC address of said different MAC address assigned to the network interface of the plurality of network interfaces from which the unicast message is being sent.

3. The apparatus of claim 1, wherein the processing element is further configured for initiating the sending of unicast packets from the plurality of network interfaces.

4. The apparatus of claim 3, wherein a different MAC address corresponds to each of the plurality of network interfaces, and each subset of said unicast packets sent from a particular network interface of the plurality of network interfaces includes a particular MAC address corresponding to the particular network interface.

5. The apparatus of claim 1, wherein the multicast packet is an Ethernet or Token Ring protocol packet.

6. A method for sending packets from a plurality of network interfaces of a device, the method comprising:
   identifying information to be sent in a multicast packet;

encapsulating said information in the multicast packet, the multicast packet including a particular media access (MAC) source address as the source MAC address of the multicast packet; and sending the multicast packet with the particular MAC source address as the source MAC address of the multicast packet from the plurality of network interfaces.

7. The method of claim 6, wherein said information includes an Internet Protocol (IP) multicast packet.

8. The method of claim 7, wherein the multicast packet is an Ethernet or Token Ring protocol packet.

9. The method of claim 6, wherein the multicast packet is an Ethernet or Token Ring protocol packet.

10. The method of claim 6, wherein each of the plurality of network interfaces is assigned a different MAC address: and wherein the method includes sending unicast packets from each of the plurality of network interfaces with each of said unicast packets having as its MAC source address the MAC address of the different MAC addresses assigned to the network interface from which it is being sent.

11. The method of claim 10, wherein the particular source address equals one of said different MAC addresses.

12. The method of claim 10, wherein said different MAC addresses does not include the particular source address.

13. Logic encoded in one or more tangible media for execution and when execute operable to perform operations for sending packets from a plurality of network interfaces of a device, said operations comprising:

identifying information to be sent in a multicast packet;

encapsulating said information in the multicast packet, the multicast packet including a particular media access (MAC) source address as the source MAC address of the multicast packet; and sending the multicast packet with the particular MAC source address as the source MAC address of the multicast packet from the plurality of network interfaces.

14. The logic of claim 13, wherein said information includes an Internet Protocol (IP) multicast packet.

15. The logic of claim 14, wherein the multicast packet is an Ethernet or Token Ring protocol packet.

16. The logic of claim 13, wherein the multicast packet is an Ethernet or Token Ring protocol packet.

17. The logic of claim 13, wherein each of the plurality of network interfaces is assigned a different MAC address; and wherein said operations include sending unicast packets from each of the plurality of network interfaces with each of said unicast packets having as its MAC source address the MAC address of the different MAC addresses assigned to the network interface from which it is being sent.

18. The logic of claim 17, wherein the particular source address equals one of said different MAC addresses.

19. The logic of claim 17, wherein said different MAC addresses does not include the particular source address.

20. An apparatus for sending packets from a plurality of network interfaces, the apparatus comprising:

means for identifying information to be sent in a multicast packet;

means for encapsulating said information in the multicast packet, the multicast packet including a particular media access (MAC) source address as the source MAC address of the multicast packet; and means for sending the multicast packet with the particular MAC source address as the source MAC address of the multicast packet from the plurality of network interfaces.

21. The apparatus of claim 20, wherein said information includes an Internet Protocol (IP) multicast packet.

22. The apparatus of claim 21, wherein the multicast packet is an Ethernet or Token Ring protocol packet.

23. The apparatus of claim 20, wherein the multicast packet is an Ethernet or Token Ring protocol packet.

24. The apparatus of claim 20, wherein each of the plurality of network interfaces is assigned a different MAC address; and wherein said apparatus includes means for sending unicast packets from each of the plurality of network interfaces with each of said unicast packets having as its MAC source address the MAC address of the different MAC addresses assigned to the network interface from which it is being sent.

25. The apparatus of claim 24, wherein the particular source address equals one of said different MAC addresses.

26. The apparatus of claim 24, wherein said different MAC addresses does not include the particular source address.

27. An apparatus for sending packets over a plurality of networks, the apparatus comprising:

a plurality of network interfaces with each of the plurality of network interfaces coupled to one of the plurality of networks, each of the plurality of network interfaces including processing logic and memory, and each of the plurality of network interfaces configured to send packets to and receive packets from its respective network of the plurality of networks;

wherein the apparatus is configured to send multicast packets from each of the plurality of network interfaces with each of said multicast packets including a same media access source address (MAC source address) as its MAC source address; and wherein each of the plurality of network interfaces is assigned a different MAC source for use at least when sending unicast packets, and wherein the apparatus is configured to send unicast packets from each of the plurality of network interfaces with each particular unicast packet of said unicast packets including as its MAC source address the MAC source address of said different MAC source address assigned to the network interface from which said particular unicast packet is being sent.

\* \* \* \* \*

UNITED STATES PATENT AND TRADEMARK OFFICE
CERTIFICATE OF CORRECTION

| | | |
|---|---|---|
| PATENT NO. | : 8,018,932 B1 | Page 1 of 1 |
| APPLICATION NO. | : 10/184486 | |
| DATED | : September 13, 2011 | |
| INVENTOR(S) | : Eli et al. | |

It is certified that error appears in the above-identified patent and that said Letters Patent is hereby corrected as shown below:

Col. 6, line 47, Claim 2, replace "MAC address:" with -- MAC address; --

Col. 7, line 16, claim 10, replace "MAC address:" with -- MAC address; --

Signed and Sealed this
Third Day of January, 2012

David J. Kappos
*Director of the United States Patent and Trademark Office*